Nov. 17, 1925.  1,561,843
O. GARRISON
CHUCK
Filed Aug. 27, 1923    2 Sheets-Sheet 2
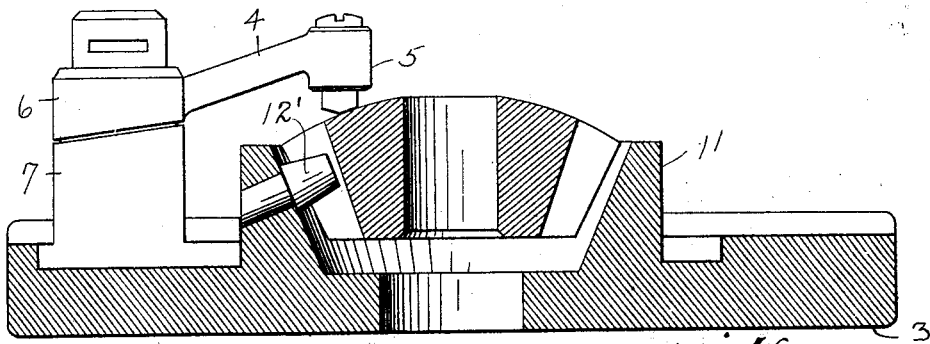
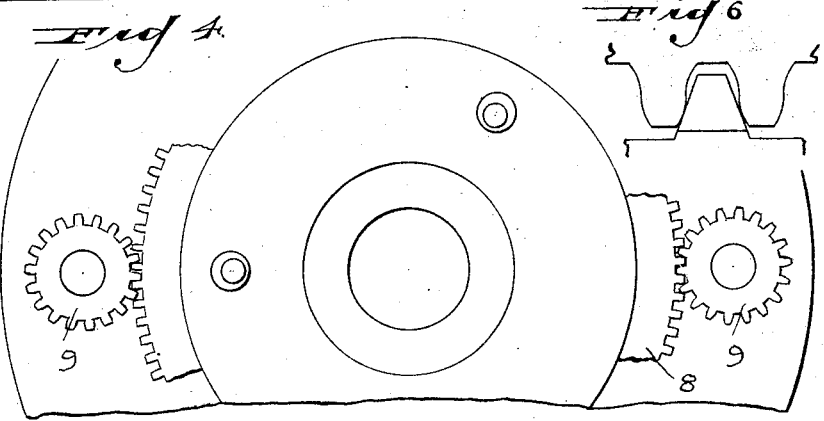
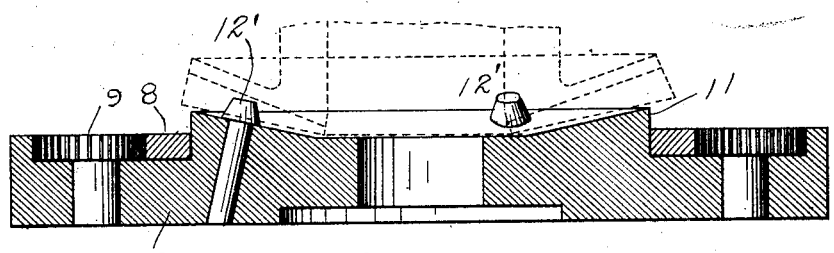
Inventor
Orlando Garrison
By J. L. Walker
Attorney Patented Nov. 17, 1925.

1,561,843

UNITED STATES PATENT OFFICE.

ORLANDO GARRISON, OF DAYTON, OHIO.

CHUCK.

Application filed August 27, 1923. Serial No. 659,587.

*To all whom it may concern:*

Be it known that I, ORLANDO GARRISON, a citizen of the United States, residing at Dayton, in the county of Montgomery and State of Ohio, have invented certain new and useful Improvements in Chucks, of which the following is a specification.

My invention relates to chucks or workholders and more particularly to locating means for centering and holding bevel gears during refinishing, boring and grinding operations. It will be understood, however, that by suitable modification the work locating means may be employed for articles other than bevel gears.

The chuck or work-holder embodies a support having an annular series of projecting studs or teeth which project intermediate the teeth of a corresponding bevel gear and engage such gear teeth only upon the pitch line of such gear in association with adjustable pressure arms movable into and out of engagement with the gear located upon such support and when engaged therewith adapted to hold the gear firmly upon the locating studs.

The particular workholding or clamping means comprising the clamp arms capable of both oscillatory and reciprocatory movement in relation with the work and the means for adjusting and controlling such arms are described in my Patent No. 1,470,158.

The object of the invention is to simplify the structure as well as the means and mode of operation of work-locating devices whereby they will be applicable to the accurate location of bevel gears and will be moreover, cheapened in construction, more efficient in use, quick and uniform in operation, and unlikely to get out of repair.

With the above primary and other incidental objects in view as will more fully appear in specification the invention consists of the features of construction, parts and combinations thereof and mode of operation or their equivalents as hereinafter described and set forth in the claims.

Figure 1:
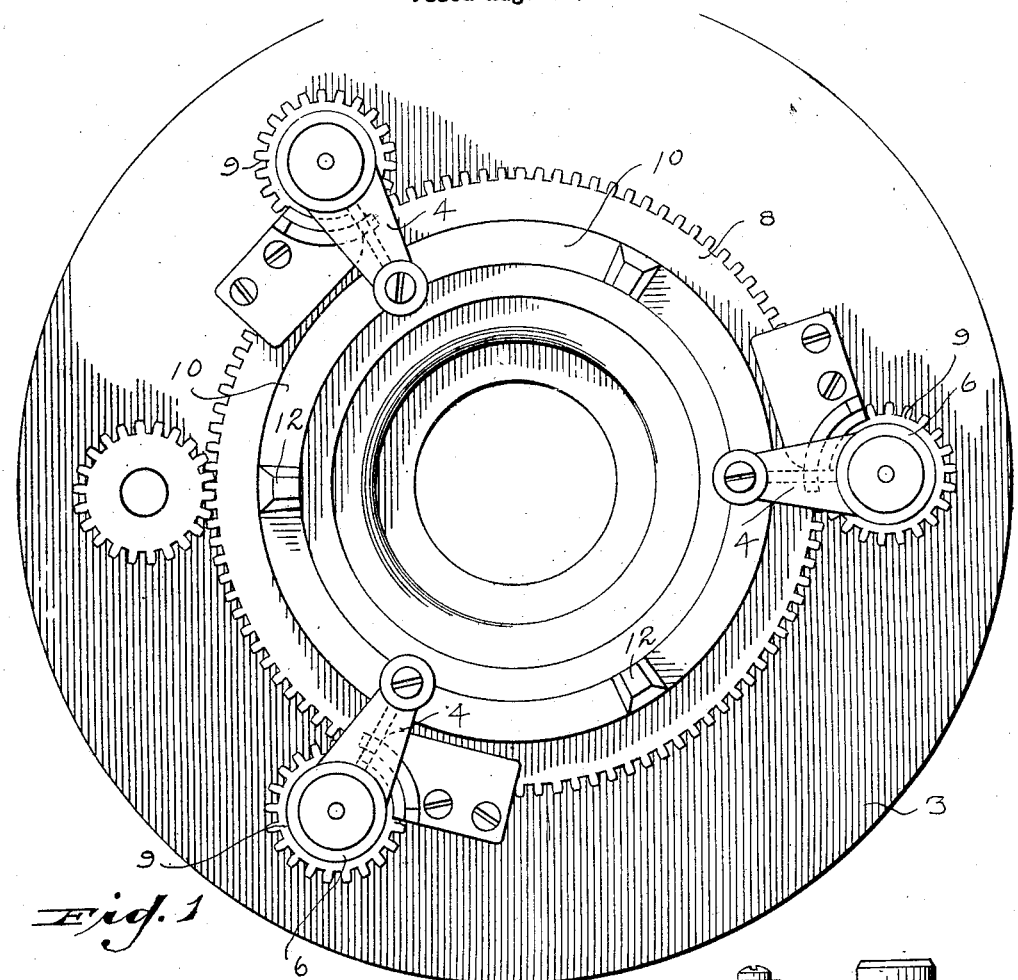
Figure 2:
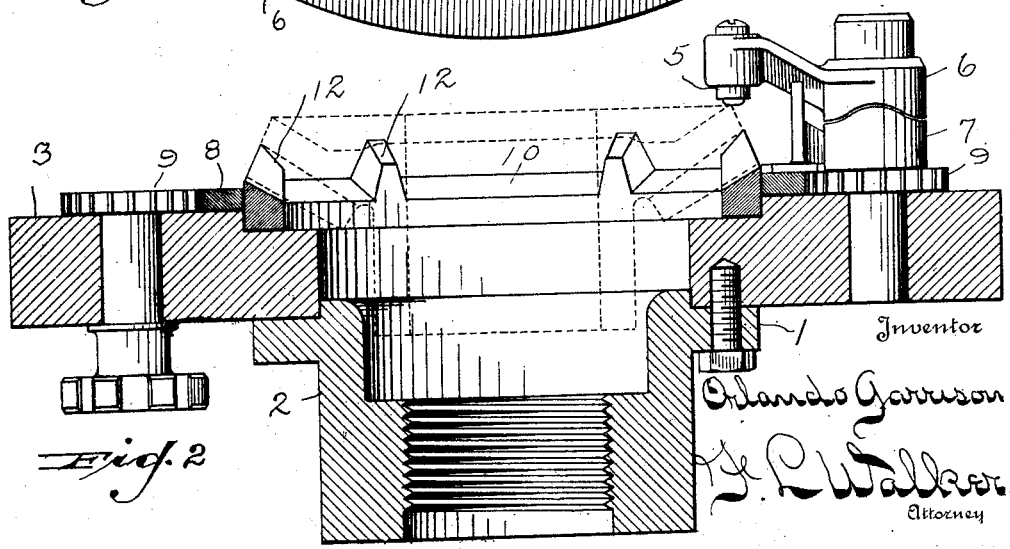

In the accompanying drawing wherein is shown the preferred but obviously not necessarily the only form of embodiment of the invention Fig. 1 is a top plan view of a chuck or workholder embodying the present invention from which the work has been removed. Fig. 2 is a transverse sectional view of the assembled chuck or workholder shown in Fig. 1 the relative position of the bevel gear being shown by dotted lines. Fig. 3 is a detailed sectional view of the workholder or locating means showing a bevel pinion of acute form located thereon the location studs in this instance being of conical form in lieu of the prismatic shape shown in Figs. 1 and 2. Figs. 4 and 5 are respectively top plan view and a transverse sectional view of the work locating device or support for the reception of a bevel gear of a comparatively flat or obtuse angle. Fig. 6 illustrates the engagement of the gear teeth with the location teeth.

Like parts are indicated by similar characters of reference throughout the several views.

In constructing the chuck or work holder and locating means there is employed a main head to be mounted upon the spindle of a grinder, boring apparatus, or other mechanism or which may be stationarily located upon a work table for operative association with a tool or grinder carried by a co-acting mechanism. In the present instance this head has been shown formed of a separable hub 2 and face plate 3 although these parts may be made integral.

To hold the gear or article operated upon in fixed relation with the supporting head there are provided a plurality of retaining arms 4 mounted upon the face plate 3 of the head for oscillatory movement into and out of overhanging relation with the work and also reciprocatory movement to and from the face plate. There may be any number of such retaining arms in accordance with the character of the work and size of the chuck. Each arm is provided with a work engaging head 5 and a bearing head or sleeve 6 located at opposite ends of the arm. The retaining arms are carried upon spring retracted studs or trunnions and the bearing heads or sleeves 6 are provided with cam faces engaging with corresponding faces upon revoluble supporting bosses or bearing sleeves 7 mounted upon the face plate. This construction is such that as the arms are rotated into and out of operative position they are also reciprocated to and from the face plate by the engagement of such cam faces against the tension of the spring retracted trunnion stud. The bearing heads 6 of the retaining arms fit rather loosely upon their trunnion studs whereby upward pressure of the work against the engaging head 5 turns the bearing sleeves 6 slightly askew upon the trunnion stud causing them to bear tightly or clutch the studs on opposite sides and so lock the retaining arms against movement. This locking engagement is easily released by applying slight upward pressure to the heads 6. The releasing pressure is applied substantially in line with the bearing stud whereas the locking pressure is extended through the leverage of the arm. To effect such release of the arm and also turn the retaining arm to inoperative position, the supporting boss or bearing sleeves 7 are revolubly mounted so that by slight rotation of the bearing sleeves 7 the inter-engaging cam faces effect the initial upward movement of the arms necessary to release them from the work and upon further rotation of the supporting sleeves or bosses 7 the arms are rotated in unison therewith out of engagement with the work. To effect the simultaneous disengagement of the several retaining arms a revoluble annular gear ring 8 is provided engaging gear pinions 9 upon the rotatable supporting bosses or sleeves 7.

The workholding arms and controlling means therefore above described are fully described and claimed in my prior patent above mentioned and per se form no part of the present invention and are here referred to merely for illustrative purposes in relation with the work locating means.

The work locating studs may be provided upon a removable ring 10 seated in a suitable recess or rabbet formed in the face plate 3 of the main head 1 or such locating studs may be positioned upon an integral flange 11 carried by such face plate as shown in Figs. 3, 4 and 5. In Figs. 1 and 2 the locating studs 12 have been shown of prismatic form while in the Figs. 3, 4 and 5 the studs 12' are of conical form. In practice the conical form of studs 12' are to be preferred inasmuch as such studs may be revolubly adjusted in their mounting from time to time to present new and unworn surfaces for engagement of the work. These locating studs 12—12' are beveled or tapered and are relatively spaced to agree with the intervening spaces between the teeth of the gear to be located. They are positioned in the mounting to project perpendicular to the pitch cone of the gear and shaped or tapered to agree with the generated contour of the gear teeth, in such relation that the locating studs 12—12' will engage the gear teeth only upon the pitch line or upon the pitch cone of the bevel gear. The locating studs are faced off at their apices to afford clearance between the tops of the studs and the roots of the teeth of the bevel gear. Likewise they project from their mounting to their point of contact a greater distance than the addendum of the gear teeth whereby the gear is supported with clearance between the crowns of the bevel gear teeth and the mounting or support for the location studs. In other words the pitch dimension of such location stud is raised above the normal pitch line position of gear teeth thus shortening the addendum and increasing the dedendum of such locating stud. By this means the bevel gear shown in the drawing is suspended by interengagement of the gear teeth and the location studs on the pitch line of the gear, there being clearance between the gear and its support both at the crowns and the roots of the gear teeth. Inasmuch as gear teeth mesh with each other on their pitch lines or pitch cones the supporting of the gear in the chuck by engagement upon the pitch line insures the boring or the grinding of the hole in the gear being exactly concentric with the pitch circle or cone of the gear regardless of the eccentricity of the crowns or roots of the teeth. The absolute accuracy of the axis of the gear as determined by its bore with its pitch circle or pitch cone in the case of bevel gears, is highly important in insuring even and uniform rotation and intermeshing of a train of gears without noise or back lash and without pinching. While the prismatic form of location studs shown in Figs. 1 and 2 are equally as desirable and efficient and will locate the gear with equal accuracy, the conical headed studs shown in Figs. 3 to 5 inclusive are to be preferred for economy of manufacture, the capability of individual replacement in event of breakage and the capacity for revoluble adjustment to compensate for wear. As shown in Figs. 3 to 5 these conical studs are mounted in the support or holder with their axes perpendicular or at right angles to the pitch line of the gear teeth when engaged. The conical form of the head enables these studs to be hardened and ground to shape with great accuracy. If after long use the studs become at all worn on their points of engagement with the gear they may be slightly rotated from time to time in their mounting to present new bearing surfaces. Moreover the conical stud affords a single point bearing with the gear tooth so that the gear is capable of a slight rocking movement upon the stud until it bears evenly upon the several locating studs of the series. Any number of such locating studs may be employed. However, for practical purposes three studs positioned approximately 120 degrees apart will be found most practical. It is to be noted that the locating studs are relatively fixed in relation with each other and hence the circle of contact upon such studs is constant. The gear to be engaged is adjusted in relation with the stud and not the stud relative to the gear to be held, as is the case in some prior constructions. The studs have no function in holding or clamping the gear or work in place but serve to locate the gear in order that its bore may be machined or finished exactly concentric with its pitch circle, except as such studs prevent the rotation of the gear during the finishing operation. The gear is clamped against the relatively fixed studs by means of the adjustable clamp arms.

Applicant is aware that heretofore chucks have been provided for engaging bevel gears but in such cases the gears have been located either by the crowns of the teeth of by the roots of the teeth so that the bore of the gear when finished while held in such chuck will be concentric with the crown or external surface of the gear or it will be concentric with the roots of the teeth but not necessarily concentric with the pitch diameter which is of utmost importance. The present chuck is designed to dimension or locate points upon the gear by employing the pitch circle or pitch cone as the standard or base line from which all other dimensions are computed. Such gears intermesh upon their pitch lines. Thus dimensioning with the pitch circle as the basis of operation is of utmost importance in insuring smooth and silent running gears.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in langauge more or less specific as to structural features, it is to be understood that the invention is not limited to the specific details shown, but that the means and construction herein disclosed comprises the preferred form of several modes of putting the invention into effect and the invention is therefore claimed in any of its forms or modifications within the legitimate and valid scope of the appended claims.

Having thus described my invention, I claim:

1. In a chuck for bevel gears, a seat therefor, a plurality of relatively fixed gear engaging studs of conical form with which the gear engages in an axial direction, carried by the supporting seat within the peripheral circle of the gear, and simultaneously engaging with the teeth of the gear upon the pitch line thereof at different radial points and means for holding the gear in engagement with the studs.

2. In a chuck for bevel gears, a main body or support, a plurality of relatively fixed gear engaging projections carried thereby but independently rotatable about their own axes, against which the gears are laterally pressed, simultaneously engaging the teeth of the gear upon the pitch line thereof at different radial points and means for pressing the gear against said projections.

3. In a chuck for bevel gears, a supporting member, a circular series of relatively fixed conical protuberances rotatably adjustable in the supporting member, projecting in an axial direction therefrom, and located wholly within the periphery of the gear to be engaged, and so positioned and shaped as to simultaneously engage within the indentations of the engaged gear, on substantially the pitch line only of the gear teeth.

4. In a holder for bevel gears, a circular series of conical studs supported in spaced relation one with the other engaging the face of the gear in an axial direction, the studs being shaped and proportioned to afford lateral engagement only with the teeth of the bevel gear substantially upon the pitch line thereof.

5. In a holder for bevel gears, a supporting member, and a circular series of truncated conical studs projecting therefrom with their axes substantially perpendicular to the pitch cone of the gear to be engaged, said studs being shaped and proportioned to engage within the indentations of the gear substantially upon the pitch line of the gear teeth and support the gear in elevated relation above the support and with clearance between the ends of the studs and the roots of the gear teeth.

6. In a holder for bevel gears and the like, a main supporting member and a plurality of truncated conical studs carried thereby and engageable with the teeth of the gear substantially upon the pitch line thereof whereby said gear will be centered in relation with said support concentric with the pitch circle of the gear and regardless of the crowns and roots of the teeth.

7. In a holder for bevel gear and the like, a supporting member, and a plurality of truncated conical revolubly adjustable locating studs positioned and arranged to engage the teeth of the rear upon the pitch line thereof and center the gear relative to the support concentric with the pitch circle regardless of the crowns and roots of the teeth, said studs being revoluble to compensate for wear of the points of engagement.

In testimony whereof, I have hereunto set my hand this 24 day of August A. D. 1923.

ORLANDO GARRISON.